Aug. 11, 1942.  F. W. GAY  2,292,935

TIMING RELAY FOR POWER CIRCUIT RUPTURING MEANS

Filed Feb. 8, 1941

INVENTOR
Frazer W. Gay,
BY
George S. Richards
ATTORNEY

Patented Aug. 11, 1942

2,292,935

UNITED STATES PATENT OFFICE 2,292,935

TIMING RELAY FOR POWER CIRCUIT RUPTURING MEANS

Frazer W. Gay, Metuchen, N. J.

Application February 8, 1941, Serial No. 378,095

13 Claims. (Cl. 175—294)

This invention relates to a novel relaying system for electric utility systems.

Relaying systems, as heretofore used, utilize currents flowing to the fault to disconnect the faulty section from the rest of the system. These relaying systems, when they function as expected perform satisfactorily, but since their proper functioning in the predetermined manner for a particular fault is contingent on all involved equipment functioning as planned; if any of the involved equipment fails to function as planned, the relays fail to protect the system effectively. Persistent low voltage is the best criterion of a fault, and the degree of persistent lowness is the most reliable indication of the nearness of the fault. It has been observed that following a fault, the average maintained voltage is a minimum in the region of the fault.

The present relay system functions upon the occurrence of low voltage on a system to start timing relays associated with each bus section. These timing relays function to disconnect all circuits to the associated bus after a time interval which is directly proportional to the lowness of the voltage below some predetermined value. These relays therefore function to cause those circuits nearest the fault to be the first to be disconnected.

System faults may be classified as of low impedance value or of high impedance value. Faults are arbitrarily classified in the following description as of low impedance if they lower the system voltage at any bus section below 20 percent of its normal value, and of high impedance if they lower the system voltage on any bus section to less than 80 percent but more than 20 percent of normal value.

It will be obvious to one skilled in the art, that a fault which lowers the voltage on any phase at any bus section to 20 percent or less, seriously disturbs the smooth operation of the system, and such a fault must be very quickly removed if the system is not to be seriously disturbed. It is therefore proposed to set those relays (arranged to trip on low impedance fault) to trip the circuit breakers connected to the associated bus in approximately 20 cycles, i. e., one-third of a second after the occurrence of a fault if the voltage on any phase of the associated bus is reduced to zero. Relays so adjusted will trip breakers in 40 cycles if the voltage is reduced to 10 percent of normal, and in 80 cycles if it is reduced to 15 percent of normal, and in 160 cycles if it is reduced to 17½ percent of normal, etc. The relay timer so adjusted will not operate to close its trip circuits if the voltage is above 20 percent of normal. In addition to the timing device which is provided for each bus to clear its circuits for low impedance faults, an additional identical timing device is provided at interconnecting points, or if desired, at every bus section for high impedance faults. It is obvious that if the fault is of low impedance, the high speed low impedance timing devices will clear the fault before the low speed high impedance timing devices close their trip contacts and these high impedance timing devices will automatically reset.

An object of the present invention is to provide a relay system which will very quickly disconnect from the system a low impedance fault.

Another object of this invention is to provide a relaying scheme capable of discriminating very closely as to the location of a fault.

Another object of this invention is to provide, in addition to a high speed inverse timing relay adapted to operate on low impedance faults, a slower speed relay system having great discrimination to remove high impedance faults from the system, or to break up a system at predetermined points for an out of step condition.

Other objects of this invention, not at this time more particularly enumerated, will be clearly understood from the following detailed description of the same.

The invention is clearly illustrated in the accompanying drawing in which.

Figure 1:
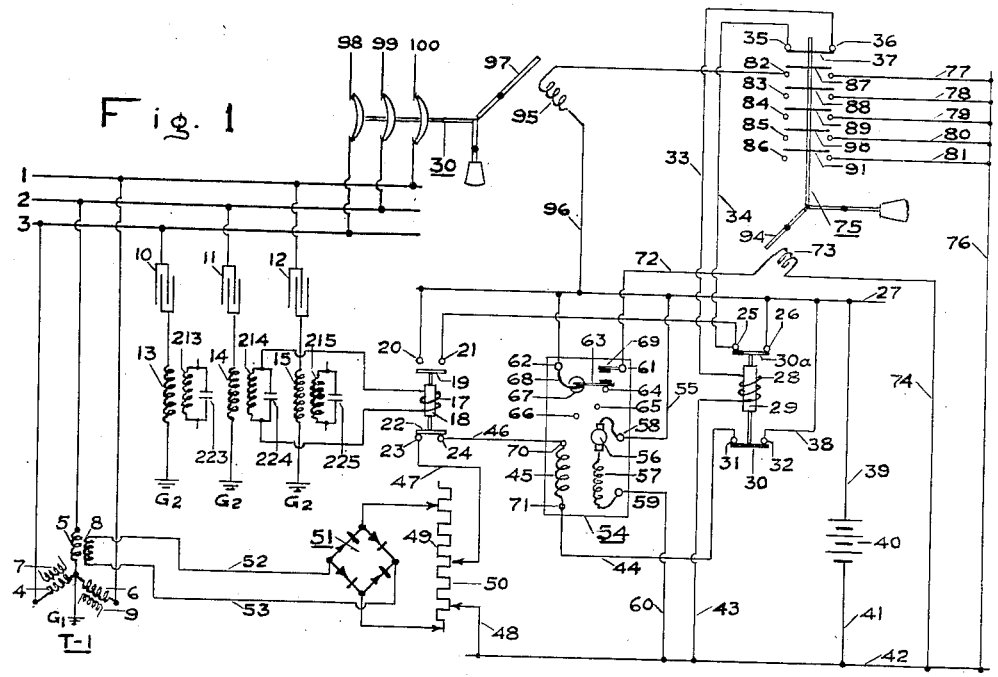
Fig. 1 shows a single relay device applied to the middle phase of a three phase bus section.
Figure 2:
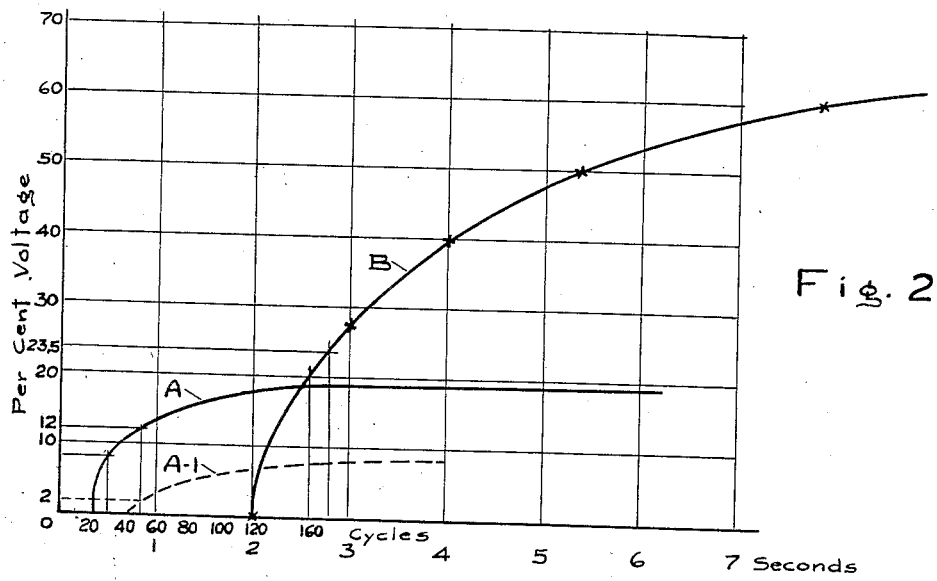
Fig. 2 is a graph, in which curve A illustrates the application of the device to care for a low impedance fault in a relatively short time interval. Curve B shows the relay device adjusted either for a high impedance fault, or to segregate the faulted portion of the system from the balance of the system.
Figure 3:
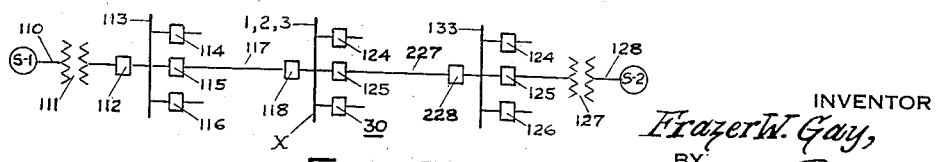

In Fig. 1 1, 2, and 3 represent the conductors of a bus section of a three phase system. 30 is a three phase circuit breaker supplying bus power to the three phase cricuits 98, 99, and 100. T—1 is a three phase star connected potential transformer with primaries 4, 5 and 6 having their neutrals grounded at G and at the other end connected to the bus conductors 3, 2, 1 respectively. Secondaries 7, 8 and 9 are associated with primaries 4, 5 and 6 respectively. Capacitors 10, 11 and 12 are each connected in series with the primaries 13, 14 and 15 respectively and the other ends of these primaries are connected to ground at G2. The high potential ends of capacitors 10, 11 and 12 are connected to the conductors 3, 2, 1 of the bus section protected. Secondaries 213, 214 and 215 are associated with primaries 13, 14 and 15. These secondaries are shunted by capacitors 223, 224 and 225 respectively, so that the voltage across a low voltage capacitor, as for instance 224, is proportional to the voltage across its associated high voltage capacitor 11, i. e., it is proportional to the voltage to ground of bus conductor 2. However, these secondaries are fully insulated against high frequency surges which may reach their associated primaries 4, 5 and 6 and may therefore be independently grounded. A voltage relay has its plunger 18 pulled up by coil 17. The lifting of plunger 18 opens contacts 23 and 24 by the lifting of disc 22 and simultaneously closes contacts 20 and 21 by the lifting of disc 19. The coil 17 is energized by the voltage across secondary 214, i. e., it is energized by voltage derived from phase conductor 2. 54 represents the timing element of the present relay device and is a modified form of a direct current, watt hour meter; the revolving element of such watt hour meter having the usual means for producing drag proportional to its rotative speed. The armature 56 of the watt hour meter is connected in series with a high resistance compensating coil 57. This circuit, comprising an armature 56 of many turns of wire and a field 57 of a few turns of wire, is connected through leads 55 and 60 to battery bus conductors 27 and 42. These bus conductors 27 and 42 are energized by battery 40. A high speed register has connected to its shaft the contact arm 63, and the battery current normally passing through armature 56 and field 57 causes contact arm 63 to creep in the direction of the stop 64 and press gently against it. Stop 64 may be placed in position 65 or 66 or any intermediate position, and contact arm 63 will creep around until the arm is against the stop.

28 is the coil of a sealing-in relay having a magnetic plunger 29, 29 is drawn upward whenever the voltage coil 17 is energized. Current flows from the battery bus 27 through contacts 20 and 21 bridged by contact disc 19 to the contact 25, thence through the contacts 35 and 36 of multi trip relay 75. These contacts 35 and 36 are bridged by the disc 37 latched in position by trip latch 94. The current flows through coil 28, through lead 43 to battery bus 42, thence via lead 41 through battery 40 and lead 39 to the battery bus 27. When plunger 29 is raised, discs 30 and 30a close contacts 31 and 32 and 25 and 26. The closing of 25 and 26 seals the current in coil 28 through contacts 35 and 36 of multi trip relay 75.

The closing of contacts 31 and 32 by disc 30 closes the electrical circuit from battery bus 27 through lead 38, disc 30, lead 44, timing relay current coil 45, lead 46, disc 22, resistor section 50, lead 48, to battery bus 42. The current then returns via lead 41, battery 40, and lead 39 to battery bus 27. A full wave rectifier 51 has its D. C. output leads connected across variable resistor 49, of which resistor 50 is a part. Full wave rectifier 51 receives alternating current over leads 52 and 53 from one secondary phase 8 of transformer T—1.

The operation of this device is as follows.

With normal voltage on bus conductors 1, 2, 3 normal, direct current voltage will be impressed on resistor 49 via potential transformer T—1, coil 8, and full wave rectifier 51. The direct current circuit through timing relay coil 45 is tapped off a section 50 of this resistor 49 and if, for instance, it is desired that the battery 40 be discharged through this resistor 50 only when the voltage of the circuit is say 20 percent of normal, then the voltage across resistor 50 under normal operating conditions will be five times the voltage across the low voltage storage battery 40.

It will be noted, that whenever system voltage is approximately normal, armature 18 is drawn up by the current in coil 17 and contacts 23 and 24 are open. If, under these conditions, armature 18 were forcibly held down against the pull of coil 17, or if the circuit of coil 17 were opened, there would be a very heavy direct current through coil 45, contact disc 30, and battery 40. This current would tend to charge the battery and it would very greatly increase the torque on the high speed register disc, so that contact arm 63 would press with great force against stop 64.

If, now, the voltage should fall by reason of a short circuit to say 20 percent of normal, plunger 18 would drop and disc 22 would close contacts 23, 24, then the voltage impressed across resistor 50 by rectifier 51 would exactly balance the voltage of battery 40 and there would be no current in coil 45. If the bus voltage should fall to zero, full battery voltage would be impressed across resistor 50, and the battery would supply a discharge current through contact disc 30, coil 45, contact disc 22, and resistor 50. This discharge current through coil 45 would cause a rapid turning of the high speed register carrying arm 63, and this contact arm 63 would strike contact 69 in a period of 20 cycles. At this instant, current would flow from battery bus 27 through wire 62, flexible lead 68, contact arm 63, contact 69, terminal 61, wire 72, trip coil 73, wire 74 to battery bus 42 and then back via wire 41, battery 40, and wire 39 to battery bus 27. This current in trip coil 73 will draw down trip 94 and release multi trip relay 75. The contact discs 87, 88, 89, 90, and 91 (and other discs if required) will bridge their associated contacts closing their trip circuits of which the circuit through contact 87 is a sample. This circuit passes from battery bus 27 through the trip coil 95 of breaker 30, through contact 82, disc 87, and wire 77 to leads 76 and battery bus 42, thence through lead 41, battery 40, lead 39 to battery bus 27. The current in trip coil 95 pulls down trip 97 thus tripping breaker 30. In the same manner all other breakers, as for instance 118, 124, 125 (Fig. 3), connecting to section of bus 1, 2, 3 are tripped and bus 1, 2, 3 is dead. At the same time multi trip relay 75 on opening simultaneously opens contacts 35 and 36, and armature 29 drops opening contacts 31 and 32. Current ceases in coil 45 and the timer 54 gradually resets, i. e., the small current normally flowing from the battery through armature 56 and coil 57 slowly turns high speed register to swing the arm 63 against the stop 64. In order to again close contacts 31 and 32 it is necessary to close multi trip relay 75 and to energize the bus section 1, 2, 3 by hand closing a breaker, as for instance 118. If this breaker is closed and voltage does not immediately appear on bus 1, 2, 3 this breaker must be tripped by hand. If voltage appears on bus section 1, 2, 3 plunger 18 of the voltage relay will rise, contacts 20 and 21 will close, coil 28 will be energized, plunger 29 will rise closing contacts 31 and 32 and 25 and 26. The closing of contacts 25 and 26 seals the current in coil 28 until multi trip relay 75 again opens. The relay equipment is thus automatically reset.

Curve A, Fig. 2 shows the time in cycles for relay timer to operate plotted against the percentage voltage. Thus, if the voltage on the bus drops to zero, timer 54 will close its trip contacts in 20 cycles. If it drops to 10 percent, the current in coil 45 will be one-half and trip contacts will close in 40 cycles. If the bus voltage is 15 percent, the current in coil 45 will be one-quarter and the tripping time four times as long, i. e., 80 cycles. If the voltage is 17½ percent, the tripping time will be 160 cycles, and if the voltage is just above 20 percent, the tripping contacts will not close. Plunger 18 is adjusted to drop at approximately 80 percent voltage and rise at approximately 90 percent voltage.

If, now, a higher resistance is taken for section 50 of resistance 49, so that the drop across resistor 50 is exactly equal to the drop across battery 40 for a line voltage equal to 80 percent of normal, then for 80 percent line voltage, plunger 18 will drop, and the current in coil 45 will be zero. For voltages above 80 percent a charging current will flow into battery 40, and the arm attached to the high speed register disc will press against stop 64 with increased force proportional to the increase of line voltage above 80 percent of normal. For voltages below 80 percent of normal the battery will discharge through coil 45 and resistor 50, and the high speed register and its attached contact arm 63 will move to close against the trip contact 69 with a speed directly proportional to the drop in line voltage below 80 percent of normal, i. e., at zero voltage the rate of closing trip contacts at 69 will be twice as fast as at 40 percent line voltage. If, now, the stop 64 is set at a position so that at zero voltage the high speed register turns from the position "arm against stop 64" to the position "arm against contact 69" in 120 cycles, i. e., two seconds, then the performance of relay timer 54 will be shown by curve B, Fig. 2 and it will be seen that curve A crosses curve B at approximately 18 percent voltage and 150 cycles. It is proposed to equip a bus section with two relays: one set according to curve A and one set according to curve B. The high speed low impedance relay will function to clear the bus for all faults bringing any phase to a ground voltage of less than approximately 18 percent of normal.

If it takes not more than 10 cycles for the slowest breaker to open after trip coil 73 has been energized, then it will be seen from curve A that the greatest difficulty in discriminating between busses will be for a fault directly on a particular bus, i. e., with the fault on bus 1, 2, 3 of Fig. 1, i. e., X on bus 1, 2, 3 of Fig. 3. The voltage on bus 113 and the voltage on bus 133 must be sufficiently high so that the A type relays on these two busses will not trip until the circuit breakers on the faulted bus 1, 2, 3 have cleared, i. e., after 30 cycles. Curve A shows that this is approximately 7 volts. If, therefore, the bus 113 and the bus 133 have every phase voltage 7 percent higher than the corresponding phase voltage of bus 1, 2, 3, the high speed relay on bus 1, 2, 3 will kill this bus and remove fault X before the corresponding relays on the adjacent busses close their trip circuits, and these relays will start to reset the instant the fault X is removed.

If the fault X is of such high impedance that the minimum phase voltage on bus 1, 2, 3 is 10 percent of normal, then relay type A on bus 1, 2, 3 will function in 40 cycles, and if the corresponding relays on busses 113 and 133 do not close their trip contacts in less than 50 cycles, the fault X will be cleared before the busses 113 and 133 are killed by their relays set to adjustment A. It is seen therefore, that for a fault at X having a low impedance corresponding to a minimum bus voltage on any phase of 10 percent, it is only necessary for the voltage on busses 113 and 133 to be 12 percent of normal, i. e., if the voltages on busses 113 and 133 are maintained during such a fault more than 2 percent above the voltage on bus 1, 2, 3, then bus 1, 2, 3 will be killed and these two adjacent busses will not be killed.

A study of curve B will show that for 20 percent voltage a relay adjusted to curve B will close its trip contacts in 160 cycles. This same relay will close its contacts in 10 cycles more, i. e., 170 cycles for a voltage of 23½ percent of normal. Therefore, if the voltage on bus 1, 2, 3 for a rather high impedance fault is 20 percent and the voltages on the adjacent busses 113 and 133 are more than 3½ percent higher, bus 1, 2, 3 will be killed and the fault X removed before the relays adjusted to curve B on busses 113 and 133 function, and they will therefore start to slowly reset.

It will be evident to one skilled in the art that under normal voltage conditions a failure of transformer T—1 or the open circuiting of leads 52 or 53 taking voltage off rectifier 51 will not cause the tripping of any circuits, since the current in voltage relay coil 17 will hold relay plunger 18 in the raised position and contacts 23, 24 will be open. The usual supervisory lights (not shown) on the potential circuit of full wave rectifier 51 will indicate this trouble and the trouble should be rectified at once.

It will also be evident to one skilled in the art that the opening of any potential circuit connected to the voltage relay which would remove current from coil 17 and cause plunger 18 to drop when the voltage is normal, would merely cause a high charging current to flow through coil 45, pressing contact arm 63 hard against stop 64. The usual alarm on a separate circuit across contacts 23, 24 will indicate this defect so it can be corrected at once. It will be observed, however, that in case either one of these troubles occur simultaneously with low voltage, the relay will trip but it may not be in the desired manner.

It will be seen that if the timing relay closes its trip contacts, multi trip relay 75 will function to trip the circuit breakers 30, 118, 124, and 125 of bus 1, 2, 3 (see Fig. 3). In order to reenergize bus 1, 2, 3, it is necessary to close the multi trip relay 75. This automatically completes the coil circuit of the sealing in relay and current is restored to the coil 28 of this relay when either breaker 118 or 125 (Fig. 3) is closed, thus energizing voltage relay coil 17, lifting plunger 18, and closing contacts 20 and 21. Plunger 29 now rises and disc 30 rises, closing the timing coil contacts 31 and 32. Disc 30a simultaneously closes, sealing in contacts 25 and 26 so that plunger 29 will not again fall until timing relay operates, trips multi contact relay 75, and kills bus 1, 2, 3.

In general it will be found that in congested districts where the impedance of circuits interconnecting busses are low, and where interconnecting ground services and overhead ground wires are dense, the voltage between the busses connected by a transmission circuit when one of them is short circuited and grounded will be low. In such cases it may be found desirable to set the high speed timing relays for minimum times longer than the 20 cycles arbitrarily fixed above and also for a maximum voltage range less than the 20 percent also fixed arbitrarily above. Such a curve is shown at A—1 (Fig. 2).

For a zero impedance fault on bus 1, 2, 3, protected by a relay having the characteristics of curve A—1, an adjacent bus having 2 percent higher voltage will not be tripped.

As many changes could be made in the above construction and many apparently widely different embodiments of this invention could be made thereof, it is intended that all matter contained in the above description or shown in the accompanying drawing shall be interpreted as illustrative and not in a limiting sense.

What is claimed is:

1. A voltage relay for purposes described comprising, a stationary member and a revolving member, a power rupturing trip relay coil circuit closing means adapted to be operated by said revolving member, means adapted to excite one of said members at a substantially constant current value, a variable voltage source and a constant voltage source connected in series to excite the other said member so that the differential between said two sources excites the latter member to produce a polarity in one direction when the voltage of said variable source is of predetermined high value range and to produce a polarity in the opposite direction when the voltage of said variable source falls within a lower value range, whereby to cause a resultant current flow which is proportional to the difference between the constant and variable voltage sources.

2. A voltage relay for purposes described comprising, a stationary and a revolvable member, said revolvable member including an actuating watt hour meter mechanism having means to produce a drag proportional to the speed of its rotative element, a power rupturing trip relay coil circuit closing means adapted to be operated by said revolvable member, means adapted to excite one of said members at a substantially constant current value, a variable voltage source and a constant voltage source connected in series to excite the other said member so that the differential between said two sources excites the latter member to produce a polarity in one direction when the voltage of said variable source is of predetermined high range value and to produce a polarity in the opposite direction when the voltage of said variable source falls within a lower value range, whereby to cause a resultant current flow which is proportional to the difference between the constant and variable voltage sources.

3. In combination, a station bus, a plurality of electrical power circuits, a corresponding plurality of circuit breakers arranged each to connect its associated power circuit to said bus, a watt hour meter type relay, a relay circuit having a fixed voltage source connected in series with a voltage source derived from said bus, and a switch means actuated by said relay adapted upon closing to trip said plurality of circuit breakers, said switch means being held open by said relay when said bus derived voltage source is of higher voltage than that of said fixed voltage source, and said switch means being closed by said relay when said fixed voltage source is of higher voltage than that of said bus derived voltage source, the speed of said switch closing being directly proportional to the difference between said voltages.

4. In combination, a station bus, a plurality of electrical power circuits leading from said bus, a corresponding plurality of breaker means for said power circuits, a watt hour meter type relay, the watt hour meter mechanism of which possesses means to produce a drag proportional to the speed of its rotative element, trip contacts actuated by said relay to trip said breaker means, said relay having two fields, a constant voltage source connected to excite one said field, a voltage source taken from said bus through voltage modifying means in series with a constant voltage source of opposite polarity to excite the other field, so that the latter field has an intensity equal to the difference between the voltages of said series sources, whereby the speed of closing said trip contacts is proportional to the said voltage differences when bus voltage is lower than constant voltage in series therewith, and said trip contacts are held open when bus voltage is higher than the constant voltage in series therewith.

5. In combination, a station bus, a plurality of electrical power circuits, a corresponding plurality of circuit breakers arranged each to connect its associated power circuit to said bus, means to trip said breakers including a trip circuit, trip circuit closing means, and a relay means adapted to control said trip circuit closing means; said relay means comprising, a watt hour meter mechanism having means to produce a drag proportional to the speed of its rotative element, a timing coil for actuating said watt hour meter, a voltage source taken from said bus through voltage modifying means in series with a constant voltage source of opposite polarity to excite said timing coil, so that the actuating effect of said timing coil upon said watt hour meter mechanism is directly related to the difference between the voltages of said series sources, whereby said trip circuit closing means is held open when bus derived voltage is higher than the constant voltage in series therewith and is closed at a speed proportional to said voltage differences when bus derived voltage is lower than the constant voltage in series therewith.

6. In combination with an A. C. power circuit bus and an associated D. C. trip circuit to operate power circuit rupturing means, a D. C. current source serving said trip circuit, and a relay device to control said trip circuit; said relay device comprising, a watt hour meter actuated trip circuit switch, and a timing coil for actuating said watt meter; a resistor, a transformer means connected to receive current from said power circuit and deliver current to said resistor, a timing coil circuit for connecting said timing coil in series between said D. C. current source and a predetermined section of said resistor, whereby the differential between bus voltage and D. C. current source voltage is impressed upon said timing coil so as to produce a polarity in one direction, when bus voltage is above a predetermined desired minimum, which is effective to hold open said watt meter actuated trip circuit switch, and to produce a polarity in the opposite direction, when said bus voltage falls below said minimum, which is effective to close said watt meter actuated trip circuit switch within a period of time directly proportional to the degree of voltage drop below the desired minimum.

7. In combination with an A. C. power circuit bus and an associated D. C. trip circuit to operate power circuit rupturing means, a D. C. current source serving said trip circuit, and a relay device to control said trip circuit; said relay device comprising, a watt hour meter actuated trip circuit switch, and a timing coil for actuating said watt meter; a resistor, a transformer means connected to receive current from said power circuit and deliver current to said resistor, a timing coil circuit for connecting said timing coil in series between said D. C. current source and a predetermined section of said resistor, whereby the differential between bus voltage and D. C. current source voltage is impressed upon said timing coil so as to produce a polarity in one direction, when bus voltage is above a predetermined desired minimum, which is effective to hold open said watt meter actuated trip circuit switch, and to produce a polarity in the opposite direction, when said bus voltage falls below said minimum, which is effective to close said watt meter actuated trip circuit switch within a period of time directly proportional to the degree of bus voltage drop below the desired minimum, and a normally open electro-magnetic switch in said timing coil circuit, and means including transformer means served by said power circuit bus for energizing the coil of said electro-magnetic switch, and voltage control capacitors in the primary and secondary transformer coil circuits, whereby said electro-magnetic switch coil is deenergized to close said switch when bus voltage drops below said desired minimum.

8. In combination with an A. C. power circuit bus and an associated D. C. trip circuit to operate power circuit rupturing means, a D. C. current source serving said trip circuit, and a relay device to control said trip circuit; said relay device comprising, a watt hour meter actuated trip circuit switch, and a timing coil for actuating said watt meter; a resistor, a transformer means connected to receive current from said power circuit and deliver current to said resistor, a timing coil circuit for connecting said timing coil in series between said D. C. current source and a predetermined section of said resistor, whereby the differential between bus voltage and D. C. current source voltage is impressed upon said timing coil so as to produce a polarity in one direction, when bus voltage is above a predetermined desired minimum, which is effective to hold open said watt meter actuated trip circuit switch, and to produce a polarity in the opposite direction, when said bus voltage falls below said minimum, which is effective to close said watt meter actuated trip circuit switch within a period of time directly proportional to the degree of bus voltage drop below the desired minimum, and a normally open electro-magnetic switch in said timing coil circuit, and means including transformer means served by said power circuit bus for energizing the coil of said electro-magnetic switch, voltage control capacitors in the primary and secondary transformer coil circuits, whereby said electro-magnetic switch coil is deenergized to close said switch when bus voltage drops below said desired minimum, an additional normally closed electro-magnetic switch in said timing coil circuit the coil circuit of which is served by current from said D. C. current source, and means connected in the latter coil circuit to seal energizing current in said switch coil.

9. In combination with an A. C. power circuit bus and an associated D. C. trip circuit to operate power circuit rupturing means, a D. C. current source serving said trip circuit, and a relay device to control said trip circuit; said relay device comprising, a watt hour meter actuated trip circuit switch, and a timing coil for actuating said watt meter; a resistor, a transformer means connected to receive current from said power circuit and deliver current to said resistor, a timing coil circuit for connecting said timing coil in series between said D. C. current source and a predetermined section of said resistor, whereby the differential between bus voltage and D. C. current source voltage is impressed upon said timing coil so as to produce a polarity in one direction, when bus voltage is above a predetermined desired minimum, which is effective to hold open said watt meter actuated trip circuit switch, and to produce a polarity in the opposite direction, when said bus voltage falls below said minimum, which is effective to close said watt meter actuated trip circuit switch within a period of time directly proportional to the degree of bus voltage drop below the desired minimum, and a normally open electro-magnetic switch in said timing coil circuit, and means including transformer means served by said power circuit bus for energizing the coil of said electro-magnetic switch, voltage control capacitors in the primary and secondary transformer coil circuits, whereby said electro-magnetic switch coil is deenergized to close said switch when bus voltage drops below said desired minimum, an additional normally closed electro-magnetic switch in said timing coil circuit the coil circuit of which is served by current from said D. C. current source, means connected in the latter coil circuit to seal energizing current in said switch coil, and auxiliary switch means in a shunt circuit served by said D. C. current source, said auxiliary switch being controlled by the coil of said first mentioned electro-magnetic switch and adapted, when closed, to serve energizing current to said second electro-magnetic switch coil whereby to move said second electro-magnetic switch from an open to a closed condition when bus voltage rises above said desired minimum.

10. In an electric power system, a plurality of busses each having connecting feeder circuits, a corresponding plurality of circuit breakers respectively arranged to disconnect the feeder circuits from a given bus, trip circuits for said breakers, a plurality of relay devices for each bus each having switch means adapted to close the associated breaker trip circuit, each relay device having voltage actuated timer means to control its trip circuit switch operations, modified voltage sources energized from the associated bus to which said timer means are respectively connected for operating the associated relay devices in one direction, and constant voltage source means to operate each relay device in the opposite direction, the modified voltage source serving one relay device being adjusted to control its timer means whereby to effect the closing of the trip circuit switch actuated by said relay device, when bus voltage drops below a predetermined low value, at a speed directly proportional to the amount of bus voltage drop below said low value, the modified voltage source serving another said relay device being adjusted to control the timer means thereof whereby to effect the closing of the trip circuit switch actuated by the latter relay device, when bus voltage is of a higher value than the aforesaid predetermined low value, at a speed directly proportional to the amount of bus voltage drop below said higher value.

11. In an electric power system, a plurality of busses each having connecting feeder circuits, a corresponding plurality of circuit breakers respectively arranged to disconnect the feeder circuits from a given bus, trip circuits for said breakers, a plurality of relay devices for each bus each having switch means adapted to close the associated breaker trip circuit, each relay device having voltage actuated timer means to control its trip circuit switch operations, modified voltage sources energized from the associated bus to which said timer means are respectively connected for operating the associated relay devices in one direction, constant voltage source means to operate each relay device in the opposite direction, the modified voltage source serving one relay device being adjusted to control its timer means whereby to effect the closing of the trip circuit switch actuated by said relay device, when bus voltage drops below a predetermined low value, at a speed directly proportional to the amount of bus voltage drop below said low value, the modified voltage source serving another said relay device being adjusted to control the timer means thereof whereby to effect the closing of the trip circuit switch actuated by the latter relay device, when bus voltage is of a higher value than the aforesaid predetermined low value, at a speed directly proportional to the amount of bus voltage drop below said higher value, and means adapted to regulate switch closing operations of the respective relay devices whereby, at zero bus voltage, the lower voltage actuated relay device will close its trip-circuit switch in advance of trip circuit switch closing operation by a higher voltage actuated relay device.

12. In an electric power system, a plurality of busses each having connecting feeder circuits, a corresponding plurality of circuit breakers respectively arranged to disconnect the feeder circuits from a given bus, trip circuits for said breakers, a plurality of relay devices for each bus each having switch means adapted to close the associated breaker circuit, each relay device having voltage actuated timer means to control its trip circuit switch operations, modified voltage sources energized from the associated bus respectively in series with constant voltage source whereby to excite each timer means, the modified voltage source serving one relay device being adjusted to control its timer means whereby to effect the closing of the trip circuit switch actuated by said relay device, when bus voltage drops below a predetermined low value, at a speed directly proportional to the amount of voltage drop below said low value, and the modified voltage source serving another relay device being adjusted to control the timer means thereof whereby to effect the closing of the trip circuit switch actuated by the latter relay device, when bus voltage is of a higher value than the aforesaid predetermined low value, at a speed directly proportional to the amount of bus voltage drop below said higher value.

13. In an electric power system, a plurality of busses each having connecting feeder circuits, a corresponding plurality of circuit breakers respectively arranged to disconnect the feeder circuits from a given bus, trip circuits for said breakers, a plurality of relay devices for each bus each having switch means adapted to close the associated breaker circuit, each relay device having voltage actuated timer means to control its trip circuit switch operations, modified voltage sources energized from the associated bus respectively in series with constant voltage source whereby to excite each timer means, the modified voltage source serving one relay device being adjusted to control its timer means whereby to effect the closing of the trip circuit switch actuated by said relay device, when bus voltage drops below a predetermined low value, at a speed directly proportional to the amount of voltage drop below said low value, the modified voltage source serving another relay device being adjusted to control the timer means thereof whereby to effect the closing of the trip circuit switch actuated by the latter relay device, when bus voltage is of a higher value than the aforesaid predetermined low value, at a speed directly proportional to the amount of bus voltage drop below said higher value, and means adapted to regulate switch closing operations of the respective relay devices whereby, at zero bus voltage, the lower voltage actuated relay device will close its trip circuit switch in advance of trip circuit switch closing operation by a higher voltage actuated relay device.

FRAZER W. GAY.